US012520189B2

(12) United States Patent
Pefkianakis et al.

(10) Patent No.: US 12,520,189 B2
(45) Date of Patent: Jan. 6, 2026

(54) SYSTEM SELECTION FOR HIGH-THROUGHPUT WIRELESS COMMUNICATIONS

(71) Applicant: Apple Inc., Cupertino, CA (US)

(72) Inventors: Ioannis Pefkianakis, San Jose, CA (US); Muthukumaran Dhanapal, Sunnyvale, CA (US); Rajesh Ambati, Los Altos Hills, CA (US); Lakshmi N. Kavuri, San Jose, CA (US); Thanigaivelu Elangovan, Cupertino, CA (US); Ajay Singh, San Jose, CA (US); Dinesh Kumar Arora, Cupertino, CA (US); Raghuveer Mallikarjunan, Sunnyvale, CA (US); Gaurav Pathak, Hyderabad (IN); Palash Chaturvedi, Bhopal (IN); Narayanan Subramanian, Cupertino, CA (US); Sergey Sitnikov, Cupertino, CA (US); Abhishek Walia, Cupertino, CA (US); Ajoy K. Singh, Cupertino, CA (US); Oleg M. Moskalenko, Ben Lomond, CA (US); Sachin J. Sane, San Jose, CA (US); Avinash Viswanathan, Cupertino, CA (US); Bhumika N. Makwana, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 443 days.

(21) Appl. No.: 17/691,092

(22) Filed: Mar. 9, 2022

(65) Prior Publication Data
US 2022/0295343 A1    Sep. 15, 2022

(30) Foreign Application Priority Data
Mar. 10, 2021  (IN) .............................. 202111009995

(51) Int. Cl.
H04W 24/08    (2009.01)
H04W 28/02    (2009.01)
(Continued)

(52) U.S. Cl.
CPC ....... *H04W 28/0289* (2013.01); *H04W 24/08* (2013.01); *H04W 28/0236* (2013.01);
(Continued)

(58) Field of Classification Search
CPC ..... H04W 24/02; H04W 24/10; H04W 24/08; H04W 28/0236; H04W 28/0289;
(Continued)

(56) References Cited

U.S. PATENT DOCUMENTS

2014/0113630 A1    4/2014  Vangala et al.
2014/0269313 A1*   9/2014  Liu .................... H04W 24/02
                                              370/252
(Continued)

FOREIGN PATENT DOCUMENTS

CN    102833727 A    12/2012
CN    105873148 A    8/2016
(Continued)

OTHER PUBLICATIONS

[Unknown Author], "3rd Generation Partnership Project; Technical Specification Group Radio Access Network; Evolved Universal Terrestrial Radio Access (E-UTRA); User Equipment (UE) radio access capabilities (Release 15)," 3GPP TS 36.306 V15.10.0, Dec. 2020, 123 pages.

*Primary Examiner* — Harun Chowdhury
(74) *Attorney, Agent, or Firm* — Fish & Richardson P.C.

(57) ABSTRACT

Systems and methods performed by user equipment (UE) for communicating over a wireless communication network include receiving data representing one or more communication quality metrics for communication on a New Radio (Continued)

(NR) communication link of the wireless communication network. The method includes determining, based on the data representing the one or more communication quality metrics, a data throughput for the NR communication link of the wireless communication network. The method includes estimating a theoretical throughput for using a Long Term Evolution (LTE) communications link of the wireless network. The method includes comparing the data throughput using the NR communication link to the theoretical throughput for using the LTE communication link. The method includes causing a switch, based on the comparison, from the NR communication link to the LTE communication link.

10 Claims, 11 Drawing Sheets

(51) Int. Cl.
*H04W 36/00* (2009.01)
*H04W 36/22* (2009.01)
*H04W 36/30* (2009.01)

(52) U.S. Cl.
CPC ............... *H04W 36/00698* (2023.05); *H04W 36/008375* (2023.05); *H04W 36/22* (2013.01); *H04W 36/304* (2023.05)

(58) Field of Classification Search
CPC ......... H04W 36/00698; H04W 36/304; H04W 72/21; H04W 76/18; H04W 76/30
USPC ................................. 370/252, 329, 331, 332
See application file for complete search history.

(56) References Cited

U.S. PATENT DOCUMENTS

| | | | |
|---|---|---|---|
| 2015/0319666 A1* | 11/2015 | Kang | H04W 24/10 370/332 |
| 2016/0007253 A1* | 1/2016 | Asada | H04W 36/304 455/437 |
| 2017/0289889 A1 | 10/2017 | Sahu et al. | |
| 2020/0383155 A1* | 12/2020 | Pati | H04W 76/18 |
| 2021/0022073 A1* | 1/2021 | Kwok | H04W 72/21 |
| 2023/0180072 A1* | 6/2023 | Ranjan | H04W 36/0069 455/436 |

FOREIGN PATENT DOCUMENTS

| | | |
|---|---|---|
| CN | 106973417 A | 7/2017 |
| CN | 111093235 A | 5/2020 |
| CN | 111837421 A | 10/2020 |
| CN | 112004252 A | 11/2020 |

* cited by examiner

SYSTEM SELECTION FOR HIGH-THROUGHPUT WIRELESS COMMUNICATIONS

CLAIM OF PRIORITY

This application claims priority under 35 U.S.C. § 119(a) to Indian Patent Application No. 202111009995, filed on Mar. 10, 2021, the entire contents of which are hereby incorporated by reference.

TECHNICAL FIELD

This disclosure relates generally to wireless communications.

BACKGROUND

Wireless communication user equipment (UE) can include multiple devices or systems for transmitting and/or receiving data over wireless networks. A UE can be configured to communicate over various communications networks including WiFi networks, New Radio (NR) networks, and Long Term Evolution (LTE) networks, including third generation (3G), fourth generation (4G), fifth generation (5G) networks, and so forth. The UE is configured to communicate over various NR frequency ranges (e.g., frequency range 1 (FR1), and frequency range 2 (FR2), or other frequency ranges that are used for NR communications). The UEs communicate with base stations (e.g., next generation nodes (gNB)) or to and from client devices (e.g., mobile devices). Additionally, UEs can include multiple subscriber identification modules (SIMs) used for communication over these various communications networks.

One or more of the communications networks over which the UE is configured to communicate may become congested. Congestion on the communications network can reduce bandwidth available for communication by the UE and reduce a speed or reliability of data transfer.

SUMMARY

This application describes systems and processes for system section for high-throughput wireless communications. A UE is configured to receive data indicative of link metrics for each available communications link over which the UE is configured to communicate. The UE is configured to determine whether a network over which the UE is communicating is congested. If the network is congested, the UE is configured to switch to a different communications link over a different network. For example, the UE can be communicating using FR1 (or FR2 or another frequency range, etc.) of a 5G NR network. When a signal to noise ratio (SNR) or other link metrics fail to satisfy a minimum link quality threshold, the UE is configured to cease communications over the FR1 link and instead communicate using an alternative communication link (e.g., of an LTE network, such as a 4G LTE network). After a given amount of time, the UE can resume communicating using the NR network (or preferred communications link), provided that the network is no longer congested and that the link metrics satisfy minimum thresholds.

Additionally, or alternatively, the UE is configured to perform processes to determine whether to switch to a secondary or standby SIM (e.g., a non-default data SIM (DDS)) in a dual-SIM configuration. In this configuration, the UE can include a dual-SIM dual-standby (DSDS) mobile device configured for voice calls on one or either SIM and data on the DDS SIM. In some implementations, each SIM is configured for communications on different networks (e.g., different LTE communications networks). In this configuration, the network corresponding to the DDS SIM may be experiencing congestion, or the communications link metrics fail to satisfy one or more quality thresholds. If this occurs, the UE is configured to switch to the non-DDS SIM for a period of time (e.g., a predefined period of time). After the time period expires, the UE is configured to determine whether the original network corresponding to the DDS SIM is again suitable for communications. If the communications network corresponding to the DDS SIM is again suitable for communication, the UE switches back to the DDS SIM to resume communications using the original communication network. The evaluation of the optimal SIM for communications can be a part of the determination by the UE of whether to switch from a 5G NR network to an LTE network, such as a 4G LTE network, as previously described.

In some implementations, the UE is configured to predict future congestion in a given network and schedule a switch in the future. This can allow current operations to complete on the current network prior to switching to a different network. In another example, the UE enters an exploration phase for switching networks when congestion is detected on the current network. If the UE determines that congestion will continue, the UE switches to a different network.

The systems and processes described throughout this document provide one or more of the following advantages. A UE is configured to detect network congestion and switch to another network to enable high-throughput communications to continue without substantial interruption. Operations being performed by the UE that rely on high-throughput communications over a communications network can be performed even when a particular network is experiencing high congestion. The UE is configured to more flexibly operate.

In a first example, a method performed by user equipment (UE) for communicating over a wireless communication network includes receiving data representing one or more communication quality metrics for communication on a New Radio (NR) communication link of the wireless communication network. The method includes determining, based on the data representing the one or more communication quality metrics, a data throughput for the NR communication link of the wireless communication network. The method includes estimating a theoretical throughput for using a Long Term Evolution (LTE) communications link of the wireless network. The method includes comparing the data throughput using the NR communication link to the theoretical throughput for using the LTE communication link. The method includes causing a switch, based on the comparison, from the NR communication link to the LTE communication link.

In a second example including the first example, causing the switch, based on the comparison, comprises generating a switching signal to block FR1 measurements.

In another example including any of the previous examples, causing the switch, based on the comparison, comprises dropping a FR1 secondary cell group (SCG) signaling radio bearer (SRB).

In another example including any of the previous examples, the method further includes sending the switching signal to a baseband modem to cause the baseband modem to generate an SCG failure message for sending to a node of the communications network.

In another example including any of the previous examples, the method includes receiving LTE carrier aggregation (CA) configuration data. The theoretical throughput for using the LTE communications link is based on the LTE CA configuration data.

In another example including any of the previous examples, the LTE configuration data comprise at least one of: parallel communications controller (PCC) or serial communications controller (SCC) bandwidth levels, a quadrature amplitude modulation (QAM) configuration, and multiple-in multiple-out (MIMO) configuration data for a non-ENDC mode.

In another example including any of the previous examples, the data representing the one or more communication quality metrics for the NR communications link include at least one of a signal to noise ratio (SNR), a measured bandwidth (BW), a downlink data spit percentage, a PScell Reference Signal Received Power (RSRP), Reference Signal Received Quality (RSRQ), and Received Signal Strength Indicator (RSSI).

In another example including any of the previous examples, theoretical throughput for using the LTE communications link comprises a LTE CA combined theoretical throughput value based on the RRC configuration including bandwidth, Quadrature amplitude modulation (QAM) and MIMO configurations for LTE cell global identity (CGI) when the SDM disables NR, and wherein the method further comprises storing the LTE CA combined theoretical throughput value.

In another example including any of the previous examples, the method includes predicting a future NR throughput level based on at least one of RSRP, RSRQ, and RSSI.

In another example including any of the previous examples, comparing the data throughput using the NR communication link to the theoretical throughput for using the LTE communication link comprises determining that FR1 SNR and BW are each below a threshold value, DL Split data is flowing over FR1 over a threshold value, and a higher-order LTE CA is feasible.

In another example including any of the previous examples, the threshold value for SNR is −1 dB, the threshold value of BW is 10 MHz, and the threshold value of DL split data is 5%.

In another example including any of the previous examples, the higher-order LTE CA represents a LTE CA theoretical throughput that is either greater than or equal to NR throughput.

In another example including any of the previous examples, the method includes detecting, by an RLGS module, network congestion for the LTE communication link, and switching from the LTE communication link to the NR communication link.

In another example including any of the previous examples, the method includes setting a hysteresis timer that prevents a second switch between the LTE communication link and the NR communication link for a set period of time once a first switch has occurred.

In another example including any of the previous examples, the method includes identifying a first subscriber identification module (SIM) for the UE, the first SIM being in use for the UE. The method includes identifying a second SIM for the UE. The method includes determining that a first communication link associated with the first SIM is in a congested state. The method includes in response to the determining, switching to a second communication link associated with the second SIM.

In another example including any of the previous examples, the congested state represents one or more values of RSRP, RSRQ, a number of data stalls, and RLGS data failing to satisfy a threshold.

In another example including any of the previous examples, the method includes obtaining historic congestion data for the first SIM and the second SIM, the historic congestion data including one or more quality metrics at a particular location of the UE and a particular time. Determining that the first communication link associated with the first SIM is in the congested state is based on the historic congestion data.

In another example including any of the previous examples, the method includes predicting that the first SIM will remain in a congested state based on the historic data. The method includes delaying a switch back to the first SIM or switching to the second SIM based on the predicting.

In another example including any of the previous examples, the method includes training a statistical model based on the historic data. The predicting is based on the statistical model.

In another example including any of the previous examples, the statistical model comprises a multi-armed bandit (MAB) model.

In another example including any of the previous examples, the method includes initializing, in response to switching to the second communication link associated with the second SIM, a hysteresis timer that is configured to prevent a second switch back to the first communication link of the first SIM until after the hysteresis timer expires.

In another example including any of the previous examples, the method includes initializing, in response to switching to the second communication link associated with the second SIM, a back off timer that increases a likelihood of switching to a default data SIM once the back off timer expires.

In another example including any of the previous examples, the first SIM is a default data SIM (DDS) and wherein the second SIM is a non-DDS SIM.

In another example including any of the previous examples, the second SIM is a DDS SIM and wherein the first SIM is a non-DDS SIM.

In another example including any of the previous examples, the first communication link and the second communication link are both NR communication links.

In another example including any of the previous examples, the first communication link and the second communication link are both LTE communication links.

In another example including any of the previous examples, the first communication link is a NR communication link, and wherein the second communication link is a LTE communication link.

In another example including any of the previous examples, the first communication link is a LTE communication link, and wherein the second communication link is a NR communication link.

In another example including any of the previous examples, the method including determining that E-UTRAN New Radio-Dual Connectivity (ENDC) communication link is congested based on one or more quality metrics associated with the ENDC communication link. The method includes switching, based on the determining, to an LTE Pcell. The method includes determining that the LTE Pcell is congested. The method includes determining that a neighbor cell to the LTE Pcell is not congested. The method includes switching to the neighbor.

In a second aspect, a method performed by user equipment (UE) for communicating over a wireless communication network. The method includes receiving RLGS quality metrics data for a communications link of a first subscriber identification module (SIM) for the UE. The method includes determining a congestion severity for the first SIM. The method includes determining that the congestion severity exceeds a threshold. The method includes switching to a second SIM based on the determining that the congestion severity exceeds the threshold.

In an example including any of the previous examples of the second aspect, determining that the congestion severity exceeds a threshold comprises: inputting the RLGS quality metrics data and data representing a number of data stalls into a machine learning model that is trained with historic RLGS quality metrics data. The method includes executing the machine learning model to cause the machine learning model to generate an output indicative of a high congestion classification or a low congestion classification, wherein the high congestion classification represents the congestion severity that exceeds the threshold.

In another example including any of the previous examples of the second aspect, the historic data represents RLGS quality metrics data obtained, for the first SIM, at one or more different locations and at one or more different times for each of the one or more different locations.

In another example including any of the previous examples of the second aspect, the method includes setting a hysteresis timer configured to prevent a second switch from the second SIM to the first SIM until a predetermined time period expires.

In another example including any of the previous examples of the second aspect, the method includes setting a back-off timer configured to pause a bias for switching to a DDS SIM of the first SIM and the second SIM until a predetermined time period expires.

In another example including any of the previous examples of the second aspect, the first SIM is a default data SIM (DDS) and wherein the second SIM is a non-DDS SIM.

In another example including any of the previous examples of the second aspect, wherein the second SIM is a DDS SIM and wherein the first SIM is a non-DDS SIM.

In a third aspect, a user equipment (UE) for communicating over a wireless communication network includes at least one processing device and a memory storing instructions, that when executed by the at least one processing device, cause the at least one processing device to perform operations. The operations include receiving data representing one or more communication quality metrics for communication on a New Radio (NR) communication link of the wireless communication network. The operations include determining, based on the data representing the one or more communication quality metrics, a data throughput for the NR communication link of the wireless communication network. The operations include estimating a theoretical throughput for using a Long Term Evolution (LTE) communications link of the wireless network. The operations include comparing the data throughput using the NR communication link to the theoretical throughput for using the LTE communication link. The operations include causing a switch, based on the comparison, from the NR communication link to the LTE communication link.

In a fourth aspect, a user equipment (UE) for communicating over a wireless communication network includes at least one processing device and a memory storing instructions, that when executed by the at least one processing device, cause the at least one processing device to perform operations. The operations include receiving RLGS quality metrics data for a communications link of a first subscriber identification module (SIM) for the UE. The operations include determining a congestion severity for the first SIM. The operations include determining that the congestion severity exceeds a threshold. The operations include switching to a second SIM based on the determining that the congestion severity exceeds the threshold.

In a fifth aspect, a processor for use in a user equipment (UE) is configured to decode, based on data received from a baseband modem, one or more communication quality metrics for communication on a New Radio (NR) communication link of the wireless communication network; determine, based on the data representing the one or more communication quality metrics, a data throughput for the NR communication link of the wireless communication network; calculate a theoretical throughput for using a Long Term Evolution (LTE) communications link of the wireless network; compare the data throughput using the NR communication link to the theoretical throughput for using the LTE communication link; cause a switch, based on the comparison, from the NR communication link to the LTE communication link; and cause a data transmission using the LTE communication link.

In a sixth aspect, a processor for use in a user equipment (UE) is configured to decode, based on data received from a baseband modem, RLGS quality metrics data for a communications link of a first subscriber identification module (SIM) for the UE; determine a congestion severity for the first SIM; determine that the congestion severity exceeds a threshold; and cause a switch to a second SIM based on the determining that the congestion severity exceeds the threshold.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

This application describes systems and processes for system selection for high-throughput wireless communications. A UE is configured to receive data indicative of link metrics for each available communications link over which the UE is configured to communicate. The UE is configured to determine whether a network over which the UE is communicating is congested. If the network is congested, the UE is configured to switch to a different communications link over a same or different network. For example, the UE can be communicating using FR1 (or FR2, or another frequency range, etc.) of a 5G NR network. When a signal to noise ratio (SNR) or other link metrics fail to satisfy a minimum link quality threshold, the UE is configured to cease communications over the FR1 link and instead communicate using an alternative communication link (e.g., of an LTE network, such as a 4G LTE network). After a given amount of time, the UE can resume communicating using the NR network (or preferred communications link), provided that the network is no longer congested and that the link metrics satisfy minimum thresholds.

Additionally, or alternatively, the UE is configured to perform processes to determine whether to switch to a secondary or standby SIM (e.g., a non-default data SIM (DDS)) in a dual-SIM configuration. In this configuration, the UE can include a dual-SIM dual-standby (DSDS) mobile device configured for voice calls on one or either SIM and data on the DDS SIM. In some implementations, each SIM is configured for communications on different communication links (e.g., different links on LTE communications networks). In this configuration, the network corresponding to the DDS SIM may be experiencing congestion, or the communications link metrics fail to satisfy one or more quality thresholds. For example, a UE can include two SIMs from a same network, but one SIM is throttled. In some implementations, this can occur based on non-technical reasons, such as a user running out of money balance on the first SIM while having budget for the second SIM. Though there is no radio level congestion, the UE is configured to switch to the second SIM of the network that is not the throttled/data exhausted SIM. If this occurs, the UE is configured to switch to the non-DDS SIM for a period of time (e.g., a predefined period of time). After the time period expires, the UE is configured to determine whether the original network corresponding to the DDS SIM is again suitable for communications. If the communications network corresponding to the DDS SIM is again suitable for communication, the UE switches back to the DDS SIM to resume communications using the original communication network. The evaluation of the optimal SIM for communications can be a part of the determination by the UE of whether to switch from a 5G NR network to an LTE network, such as a 4G LTE network, as previously described.

Figure 1:
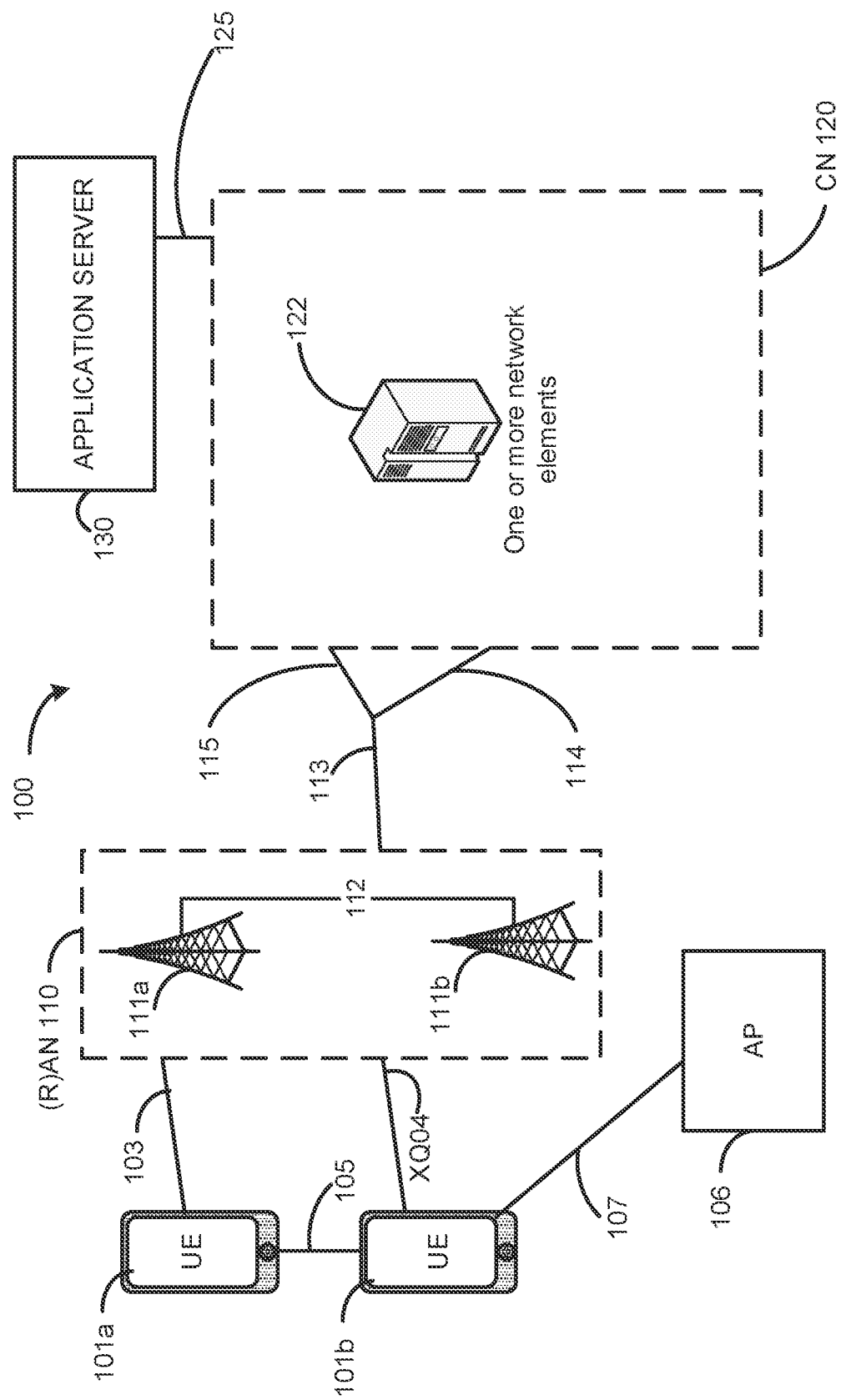
FIG. 1 illustrates an example wireless communication system, according to various embodiments herein.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101*b* is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101*b*, RAN 110, and AP 106 may be configured to utilize LWA operation and/or LWIP operation. The LWA operation may involve the UE 101*b* in RRC_CONNECTED being configured by a RAN node 111*a-b* to utilize radio resources of LTE and WLAN. LWIP operation may involve the UE 101*b* using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111*a* and 111*b* (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition.

There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two gNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network-in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMES.

Figure 2:
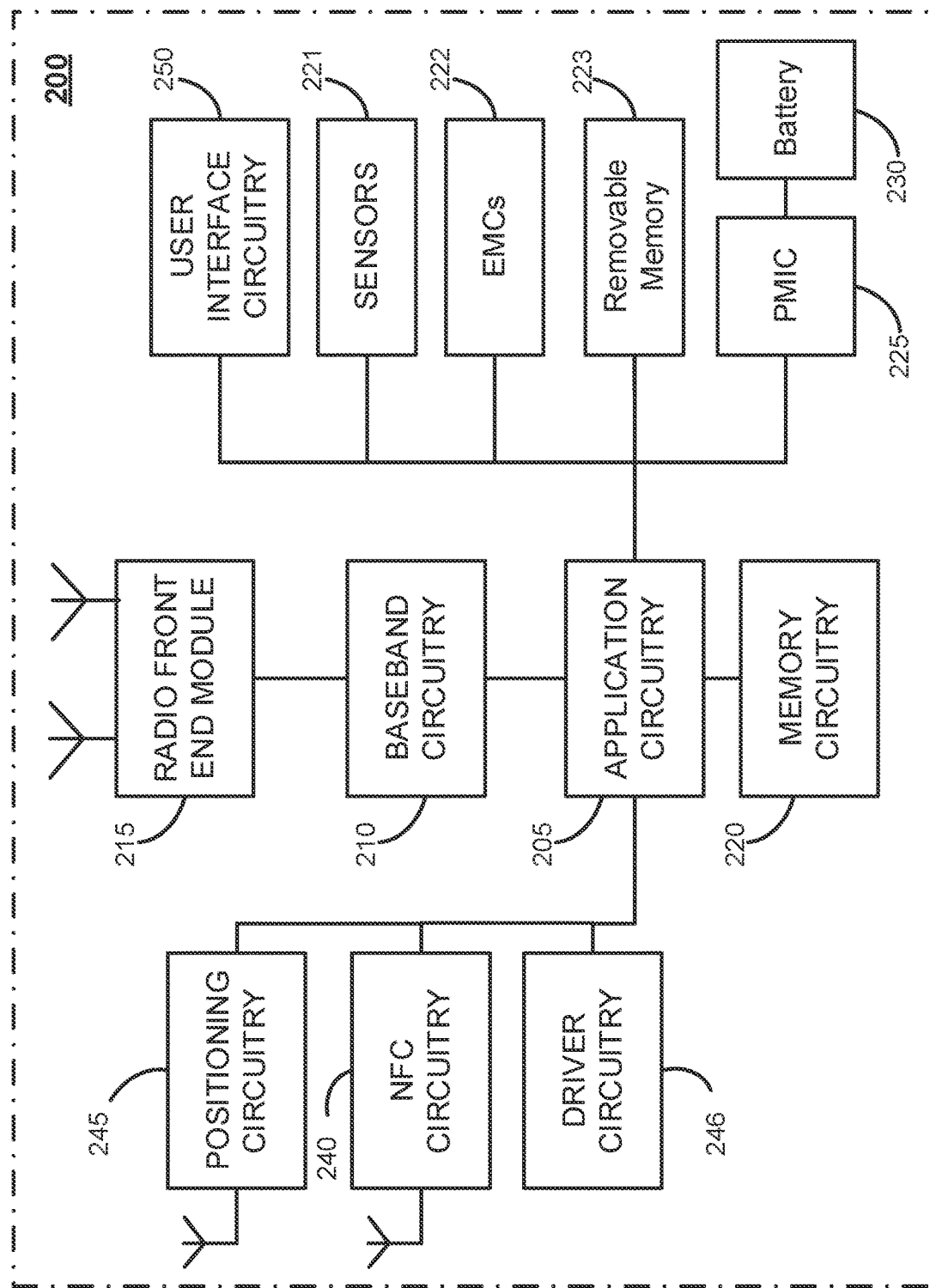
FIG. 2 illustrates an example of a platform or device, according to various embodiments herein.

FIG. 2 illustrates an example of a platform 200 (or "device 200") in accordance with various embodiments. In embodiments, the computer platform 200 may be suitable for use as UEs 101, application servers 130, and/or any other element/device discussed herein. The platform 200 may include any combinations of the components shown in the example. The components of platform 200 may be implemented as integrated circuits (ICs), portions thereof, discrete electronic devices, or other modules, logic, hardware, software, firmware, or a combination thereof adapted in the computer platform 200, or as components otherwise incorporated within a chassis of a larger system. The block diagram of FIG. 2 is intended to show a high level view of components of the computer platform 200. However, some of the components shown may be omitted, additional components may be present, and different arrangement of the components shown may occur in other implementations.

Application circuitry 205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 205 may be coupled with or may include memory/storage elements and may be configured to execute instructions stored in the memory/storage to enable various applications or operating systems to run on the system 200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 205 may include an Apple A-series processor. The processors of the application circuitry 205 may also be one or more of an Intel® Architecture Core™ based processor, such as a Quark™, an Atom™ an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 205 may be a part of a system on a chip (SoC) in which the application circuitry 205 and other components are formed into a single integrated circuit.

The baseband circuitry 210 may be implemented, for example, as a solder-down substrate including one or more integrated circuits, a single packaged integrated circuit soldered to a main circuit board or a multi-chip module containing two or more integrated circuits.

The RFEMs 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include any number and type of memory devices used to provide for a given amount of system memory. As examples, the memory circuitry 220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 220 may be developed in accordance with a Joint Electron Devices Engineering Council (JEDEC) low power double data rate (LPDDR)-based design, such as LPDDR2, LPDDR3, LPDDR4, or the like.

Removable memory circuitry 223 may include devices, circuitry, enclosures/housings, ports or receptacles, etc. Used to couple portable data storage devices with the platform 200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 200 may also include interface circuitry (not shown) that is used to connect external devices with the platform 200. The external devices connected to the platform 200 via the interface circuitry include sensor circuitry 221 and electro-mechanical components (EMCs) 222, as well as removable memory devices coupled to removable memory circuitry 223.

The sensor circuitry 221 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 222 include devices, modules, or subsystems whose purpose is to enable platform 200 to change its state, position, and/or orientation, or move or control a mechanism or (sub)system. Additionally, EMCs 222 may be configured to generate and send messages/signaling to other components of the platform 200 to indicate a current state of the EMCs 222. Examples of the EMCs 222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 200 is configured to operate one or more EMCs 222 based on one or more captured events and/or instructions or control signals received from a service provider and/or various clients.

In some implementations, the interface circuitry may connect the platform 200 with positioning circuitry 245. The positioning circuitry 245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like.

In some implementations, the interface circuitry may connect the platform 200 with Near-Field Communication (NFC) circuitry 240. NFC circuitry 240 is configured to provide contactless, short-range communications based on radio frequency identification (RFID) standards, wherein magnetic field induction is used to enable communication between NFC circuitry 240 and NFC-enabled devices external to the platform 200 (e.g., an "NFC touchpoint").

The driver circuitry 246 may include software and hardware elements that operate to control particular devices that are embedded in the platform 200, attached to the platform 200, or otherwise communicatively coupled with the platform 200. The driver circuitry 246 may include individual drivers allowing other components of the platform 200 to interact with or control various input/output (I/O) devices that may be present within, or connected to, the platform 200.

The power management integrated circuitry (PMIC) 225 (also referred to as "power management circuitry 225") may manage power provided to various components of the platform 200. In particular, with respect to the baseband circuitry 210, the PMIC 225 may control power-source selection, voltage scaling, battery charging, or DC-to-DC conversion. The PMIC 225 may often be included when the platform 200 is capable of being powered by a battery 230, for example, when the device is included in a UE 101.

In some embodiments, the PMIC 225 may control, or otherwise be part of, various power saving mechanisms of the platform 200. For example, if the platform 200 is in an RRC_Connected state, where it is still connected to the RAN node as it expects to receive traffic shortly, then it may enter a state known as Discontinuous Reception Mode (DRX) after a period of inactivity. During this state, the platform 200 may power down for brief intervals of time and thus save power. If there is no data traffic activity for an extended period of time, then the platform 200 may transition off to an RRC Idle state, where it disconnects from the network and does not perform operations such as channel quality feedback, handover, etc. The platform 200 goes into a very low power state and it performs paging where again it periodically wakes up to listen to the network and then powers down again. The platform 200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 230 may power the platform 200, although in some examples the platform 200 may be mounted deployed in a fixed location, and may have a power supply coupled to an electrical grid. The battery 230 may be a lithium ion battery, a metal-air battery, such as a zinc-air battery, an aluminum-air battery, a lithium-air battery, and the like. In some implementations, such as in V2X applications, the battery 230 may be a typical lead-acid automotive battery.

User interface circuitry 250 includes various input/output (I/O) devices present within, or connected to, the platform 200, and includes one or more user interfaces designed to enable user interaction with the platform 200 and/or peripheral component interfaces designed to enable peripheral component interaction with the platform 200. The user interface circuitry 250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 200. The output device circuitry may also include speakers or other audio emitting devices, printer(s), and/or the like. In some embodiments, the sensor circuitry 221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Processors of the application circuitry 205 and processors of the baseband circuitry 310 may be used to execute elements of one or more instances of a protocol stack. For example, processors of the baseband circuitry, alone or in combination, may be used execute Layer 3, Layer 2, or Layer 1 functionality, while processors of the application circuitry 205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 3:
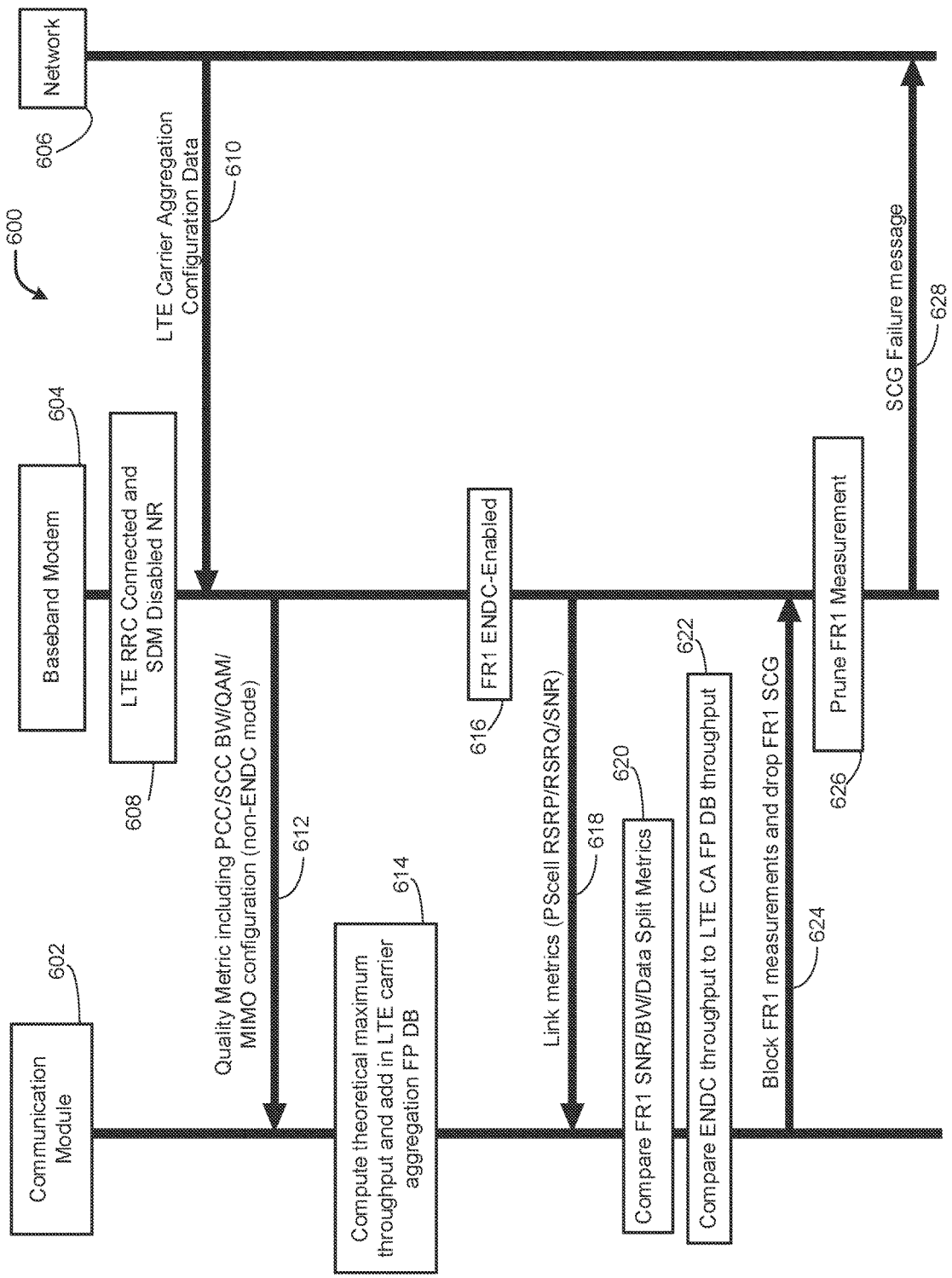
FIG. 3 illustrates an example of a process for detecting network congestion and switching from NR communications to LTE communications.

FIG. 3 illustrates an example of a process 600 for detecting network congestion and switching from NR communications to LTE communications. The process is executed by a communication module 602, which can be a part of the UE previously described in relation to FIGS. 1-2. The communication module 602 is configured to manage functionality of a baseband modem 604. The communication module 602 is a part of firmware of a UE. In some implementations, the communication module 602 is integrated with the baseband modem 604 as a part of the baseband processor. The communication module 602 is configured to communicate over a network 606 through a baseband modem 604. The communication module 602 is configured to monitor quality metrics of NR operation. As previously described, a control plane for the UE includes sending and receiving RRC messages to and from the network for control of operation of the UE on the network. This signaling language includes connection reconfiguration and measurement reporting, which enables the UE to switch between NR and LTE operation where applicable. To set up and modify the EN-DC operation, the UE is configured to interpret both the LTE and NR RRC control signaling. To transport these RRC messages between the network and a mobile device, a set of signaling radio bearers (SRBs) are used. The UE is configured to use a master cell group (MCG) SRB (e.g., SRB1 and/or SRB2). These include direct SRBs between the node (e.g., a gNB) and the communication module 602 and can be used for conveying node RRC messages. The RRC messages can embed secondary node RRC configurations. The communication module 602 is configured to use split SRBs (e.g., SRB1+SRB1S, SRB2+SRB2S). These SRBs are split between the network 606 primary node and the network 606 secondary node (at a higher layer, PDCP) towards The communication module 602, allowing primary node RRC messages to be sent via the lower layers (RLC, MAC and PHY) of either the primary node or secondary node or to be sent via the lower layers of both the master and secondary nodes. The primary node RRC message can embed secondary node RRC configurations. The communication module 602 is configured to use secondary cell group (SCG) SRBs (e.g., SRB3). This includes a direct SRB between the secondary node of the network 606 and the communication module 602 by which secondary node RRC messages are sent.

The communication module 602 is configured to receive, from the network 606 through a baseband modem 604, LTE carrier aggregation (CA) configuration data 610. In this context, The communication module 602 is configured to determine a theoretical throughput 608 when an LTE RRC is connected and smart data mode (e.g., 5G auto) disables NR (e.g., NR measurements are pruned or blocked). The communication module 602 is configured to drop a connection with the FR1 SCG based on signal-to-noise ratio (SNR) values, bandwidth (BW) levels data split percentage, and the availability of a better CA configuration 610. Here, CA refers to a technique used in LTE-Advanced to increase the peak data rate (e.g., maximum available speed) of a 4G or 5G LTE network. By aggregating multiple channels together, the total available bandwidth of a single transmission is increased, and thereby the bitrate and capacity of the network is increased. If a CA configuration representing a better connection (e.g., higher BW) is not available, the communication module 602 is configured to maintain the communication link over FR1, even if SNR, BW, or DL data split percentage metrics fall below threshold levels for dropping the FR1 link and initiating a connection using LTE.

As shown in FIG. 3, the communication module 602 is configured to receive quality metric data 612 describing the connection to the network through the baseband model 604. The communication module 602 is configured to analyze the quality metric data 612. The quality metric data can include parallel communications controller (PCC) or serial communications controller (SCC) bandwidth levels, a quadrature amplitude modulation (QAM) configuration, or multiple-in multiple-out (MIMO) configuration data (e.g., for a non-ENDC mode). The communication module 602 is configured to compute (614) a theoretical maximum throughput given the quality metrics of data 612. The theoretical throughput can be based on a database or cache (e.g., LTE CA FP DB) of the LTE CA configurations (Pcell+Configured Scell) that the UE experienced while using a LTE Serving Cell/CGI (Cell Global Identity). The theoretical throughput calculation is based on 3GPP TS 36.306 and PHY specifications where throughput is dependent on BW, QAM and MIMO configuration and number of Component carriers.

Once the communication module 602 has received the metric data and computed the theoretical throughput for LTE, the UE receives link metrics for FR1 communications. The baseband modem 604 signals (616) FR1 E-UTRAN New Radio—Dual Connectivity (FR1 ENDC) is enabled (e.g., for a call). The communication module 602 receives NR metrics data 618 describing the FR1 ENDC. For example, the communication module 602 is configured to track signal metrics including SNR, bandwidth, downlink data spit %, and so forth while in a FR1 ENDC call. The communication module 602 can track these metrics intermittently or continuously. In some implementations, the communication module 602 is configured to predict a future throughput over FR1 ENDC and/or LTE based on the values of the metrics 618 received. In some implementations, the metrics 618 include PScell Reference Signal Received Power (RSRP), Reference Signal Received Quality (RSRQ), and/or Received Signal Strength Indicator (RSSI). The communication module 602 is configured to track high bandwidth inputs. The communication module 602 is configured to cache LTE CA combined theoretical throughput based on the RRC configuration including bandwidth, Quadrature amplitude modulation (QAM) and MIMO configurations for LTE cell global identity (CGI) when the SDM disables NR. In other words, when NR measurements are pruned or blocked, the communication module 602 caches the LTE CA combined theoretical throughput.

When the communication module 602 is operating using NR (e.g., FR1), the communication module 602 compares the FR1 metrics 620 to the theoretical LTE throughput 622. The communication module 602 is configured with switching criteria, subsequently described, for switching between NR and LTE communications. If the criteria are met, the communication module 602 determines that switching operations would improve throughput overall for operation. For example, the communication module 602 does not switch between NR and LTE for an instant benefit in throughput, but if the throughput is improved over the short to medium term (e.g., over the next 30 minutes or so) by switching. The communication module 602 is configured to avoid repeated switching between LTE and NR operation rapidly by imposing a hysteresis limitation. The hysteresis limitation requires the communication module 602 to operate for a minimum amount of time on a switched communication mode (e.g., LTE from NR) before switching back to the primary communication mode (e.g., back to NR from LTE).

When switching criteria are met such that the throughput for the communication module 602 is improved by switching, the UE switches communications. For example, if drop FR1 criteria are met, the communication module 602 drops the FR1 link by triggering SCG failure and pruning FR1 measurements. If operating using LTE, The communication module 602 switches back to FR1 when the RLGS detects congestion while on LTE, or when a timer expires (e.g., for a streaming case) while using a RRC connection. The communication module 602 can also switch from LTE to FR1 and back in a similar manner if applicable.

When operating using FR1, The communication module 602 applies switching criteria for dropping the FR1 connection and using LTE communications. As previously stated, the switching criteria are based on comparisons between measured NR metrics and computed theoretical LTE CA throughput. In an example, switching criteria for dropping FR1 communications and switching to LTE can include the following. When FR1 SNR and BW are each below a threshold value, DL Split data is flowing over FR1 over a threshold value, and a higher-order LTE CA is feasible, The communication module 602 switches to LTE. The communication module 602 can perform this comparison in response to detection of data stalls and/or when high throughput or high confidence data session is available for LTE CA. The communication module 602 sends signals 624 to block FR1 measurements and drop FR1 SCG. The baseband modem 604 responds by pruning FR1 measurements 626. The baseband modem sends a message 628 to the network reporting SCG failure and can include a custom signature.

The thresholds of the signal quality metrics are tunable for the communication module 602. The exact thresholds can depend on the particular hardware of the communication module 602 and/or the particular network 606. In an example, default threshold parameters are an SNR of −1 dB, BW value of 10 Mhz, and DL Split data of 5%. In addition, the LTE CA theoretical throughput is either greater than or equal to NR throughput (e.g., FR1 ENDC).

The hysteresis timer value is set to a value that depends on the particular switch being performed. For example, the hysteresis timer for switching to NR during a streaming scenario is about 5 minutes, which is the existing SDM timer. In some implementations, the hysteresis timer is set to another value (e.g., 0 to 30 minutes, 30 minutes to an hour, etc.). When the hysteresis timer expires, the communication module 602 is again eligible to determine whether to switch between NR and LTE (e.g., back to NR from LTE). In some implementations, the communication module 602 performs another comparison when the hysteresis expires, and switches back to NR if the NR throughput is improved over LTE from the previous comparison. In some implementations, when the hysteresis timer expires, the communication module 602 switches back to NR immediately, despite existing congestion.

While the UE can be configured to switch between communication links on NR or LTE communication networks (or between LTE and NR), the UE can also be configured to determine congestion on a WiFi network and switch to another communications link in a similar manner. For example, if congestion on a WiFi network is high and the theoretical throughput on either a NR or LTE communications link is low, the UE is configured to switch from the WiFi link to the LTE or NR link (and vice versa).

Figure 4:
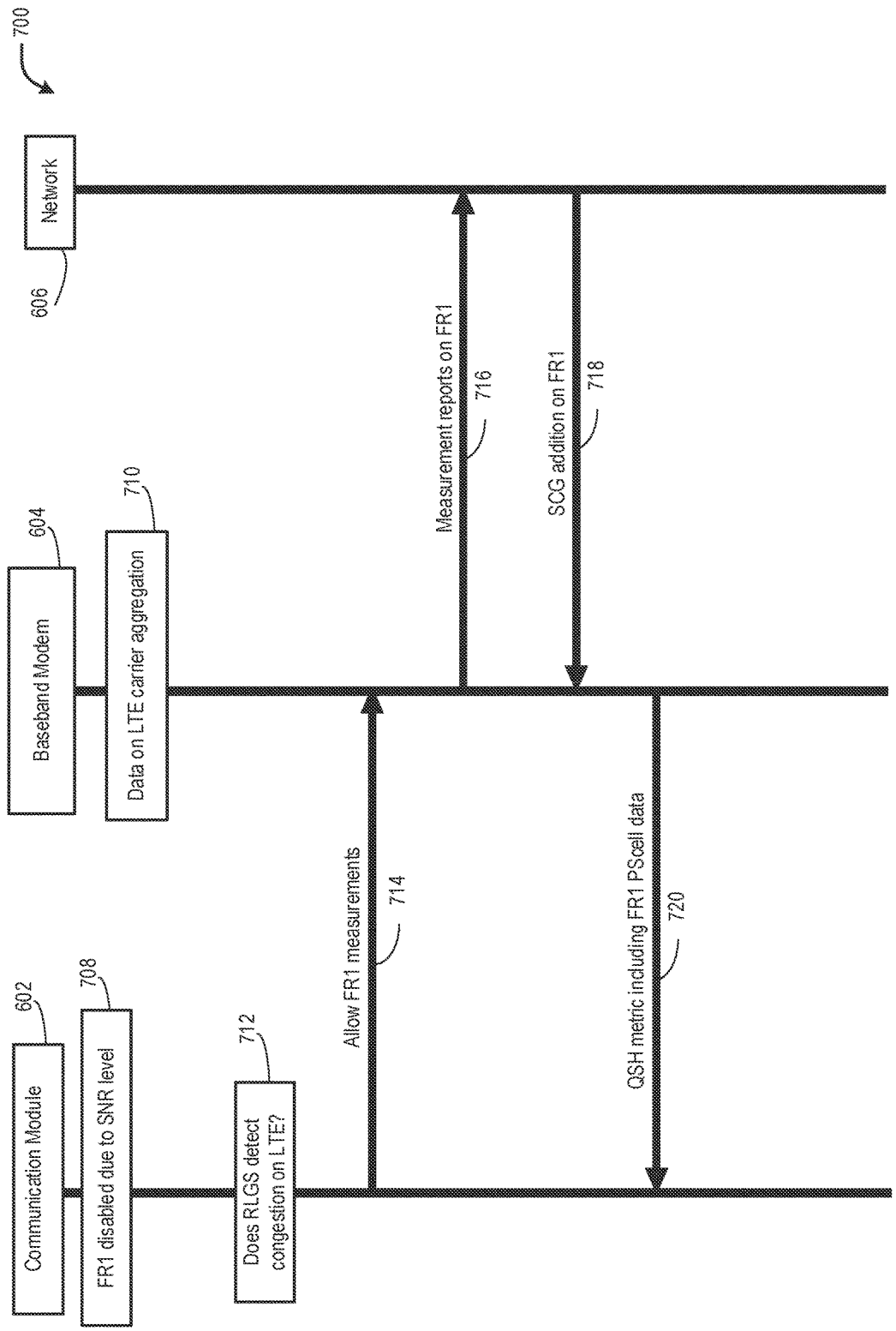
FIG. 4 illustrates an example of a process for determining whether to switch from LTE communications to NR communications.

FIG. 4 illustrates an example of a process 700 for determining whether to switch from LTE communications to NR communications. In this scenario, the communication module 602 is operating using LTE. For example, the communication module 602 may have switched from NR (e.g., FR1) in response to SNR levels 708 exceeding a threshold value. In some implementations, the communication module 602 is operating using LTE and is monitoring NR for a possible switch to NR after a comparison of theoretical throughputs. The communication module 602 monitors the LTE network for congestion at stage 712. For example, RLGS may detect congestion on the LTE network. If congestion is detected, the communication module 602 is configured to generate a signal 714 specifying that the UE is allowing FR1 measurements 714. This allows the communication module 602 to determine whether a switch (e.g., upgrade) to FR1 is desirable.

The baseband modem 604 receives LTE CA data 710 and reports this to the communication module 602. Once the baseband modem 604 receives the signal 714 from the communication module 602, the modem sends a signal 716 requesting measurement reports on FR1 (or FR2, FR3, etc.), such as from a node (e.g., a gNB) of the network 606. The network 606 (or a node of the network) responds to the modem 604 with a signal 718 reporting SCG addition on FR1. The modem 604 sends a signal 720 to the communication module 602 that specifies a QSH metric including the FR1 PScell data. The communication module 602 thus has data for determining a theoretical LTE CA throughput and also the throughput of an NR link. As previously described, the communication module 602 compares the LTE CA throughput to the NR throughput and upgrades to NR if the theoretical throughput exceeds that of using LTE CA.

Figure 5:
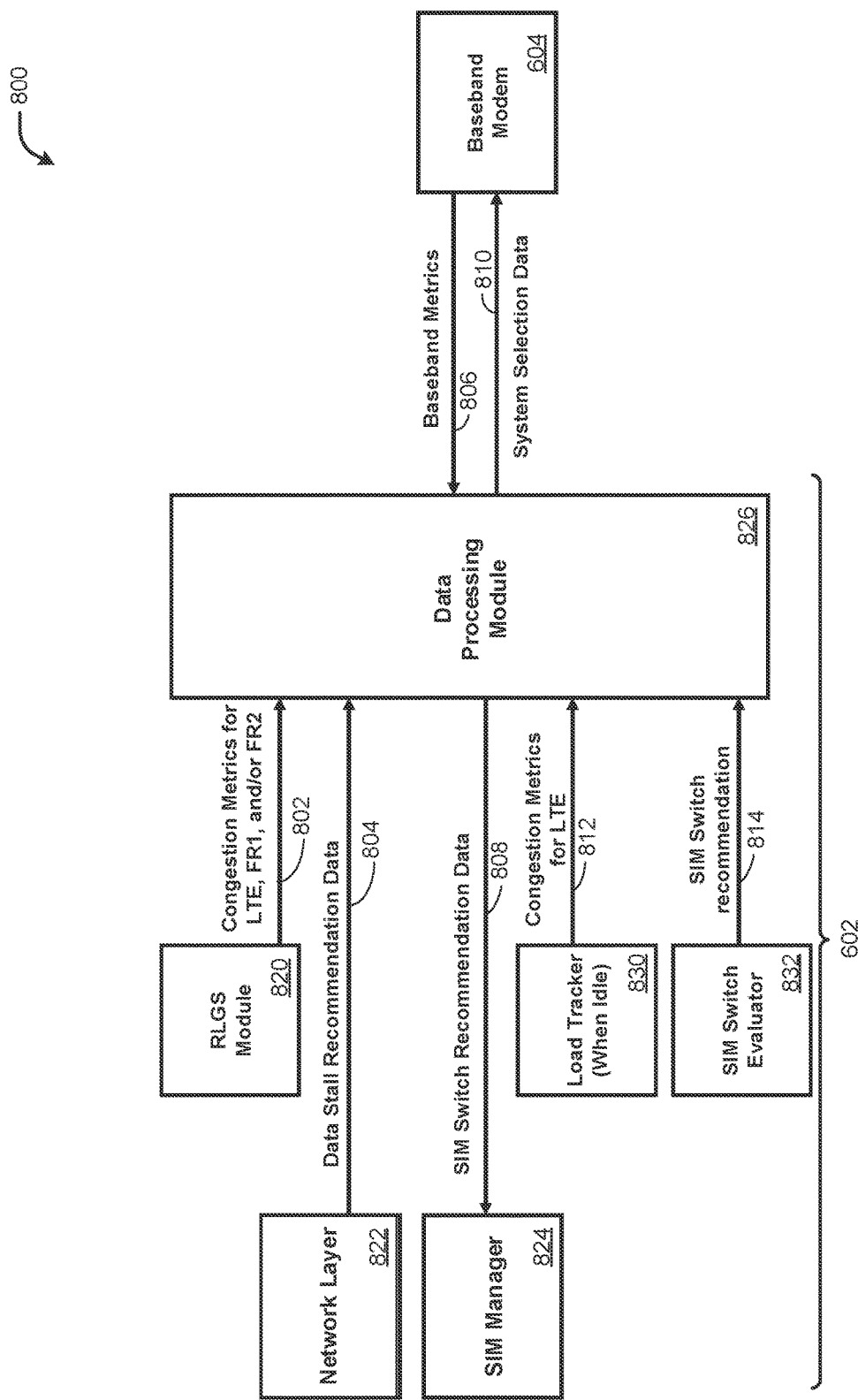
FIG. 5 illustrates a system configured for selection of a device or system for high-throughput wireless communications.

FIG. 5 illustrates a system architecture 800 configured for selection of a device or system for high-throughput wireless communications. The architecture includes a processing module 826 (which can include communication module 602 previously described), a SIM switch evaluator 832, an RLGS module 820, a networking module 822, a SIM manager 824, and a load tracker 830. The communication module 602 is configured to communicate (e.g., over a conventional interface) with a baseband modem 828.

The RLGS module 820 is configured to gather values of congestion metrics, as previously described. This includes the congestion metrics 802 (e.g., SNR, BW, DL data split percentage, etc.) for LTE (e.g., LTE CA) and NR (e.g., FR1, FR2, etc.). The values are sent to the data processing module 826, which is configured to evaluate the comparison between the LTE and NR throughputs and determine whether to switch from NR to LTE or vice versa.

The network layer 822 is configured to provide data stall recommendation data 804 to the data processing module 826. Data stall includes a stall experienced by networking layer at the operating system of the UE. Data stalls due to the core network (CN) are measured. The data stall (e.g., CN stalls) is used in combination with the stalls seen at the radio layer (e.g., by RLGS) to figure out the overall congestion. The data stall recommendation 804 can represent an indication of whether data stall is occurring based on an analysis of link metrics and provide a recommendation to the data processing module 826 that is considered during the switching analysis. The networking module 822 is configured to receive current flow information and generate advice and control messages to the data processing module 826. For example, the network layer 822 generates data including AV throughput limits, data stall metrics, LQM metrics, a number of flows, and so forth to the data processing module 826. The data provided by the networking layer 822 enables the data processing module 826 to compute congestion severity (e.g., for a SIM or for a system, such as LTE or NR).

The load tracker 830 is configured to report congestion metrics 812 for LTE when the connection to LTE is idle for the communication module 602. The data processing module 826 can use the metrics 812 data to determine a theoretical LTE throughput, as previously described.

The SIM switch evaluator 832 is configured to determine whether to switch operations from a first SIM to a second SIM of The communication module 602 when a dual-SIM configuration is available. As subsequently described, the switch from NR to LTE can include analysis by the communication module 602 of whether a switch from a first network (e.g., a first NR network) to a second network (e.g., a second, different NR network) is preferable to a switch between NR and LTE. For example, the communication module 602 determines that LTE congestion is high, and NR congestion is also high, then a SIM switch can be considered as a secondary option. If a SIM switch is recommended, the recommendation 808 is sent to the SIM manager 824 for causing the SIM switch to occur.

The data processing module 826 sends system selection data 810 to the baseband modem 604 depending on the selected system (e.g., LTE or NR). The message in the system selection data 810 varies depending on what system is selected. For example, the message may indicate that FR1 measurements are being dropped if switching to LTE from NR. Other message data is possible to initiate the switch of systems with the network. The baseband modem 604 sends BB metric data back to the data processing module 826 as previously described.

Figure 6:
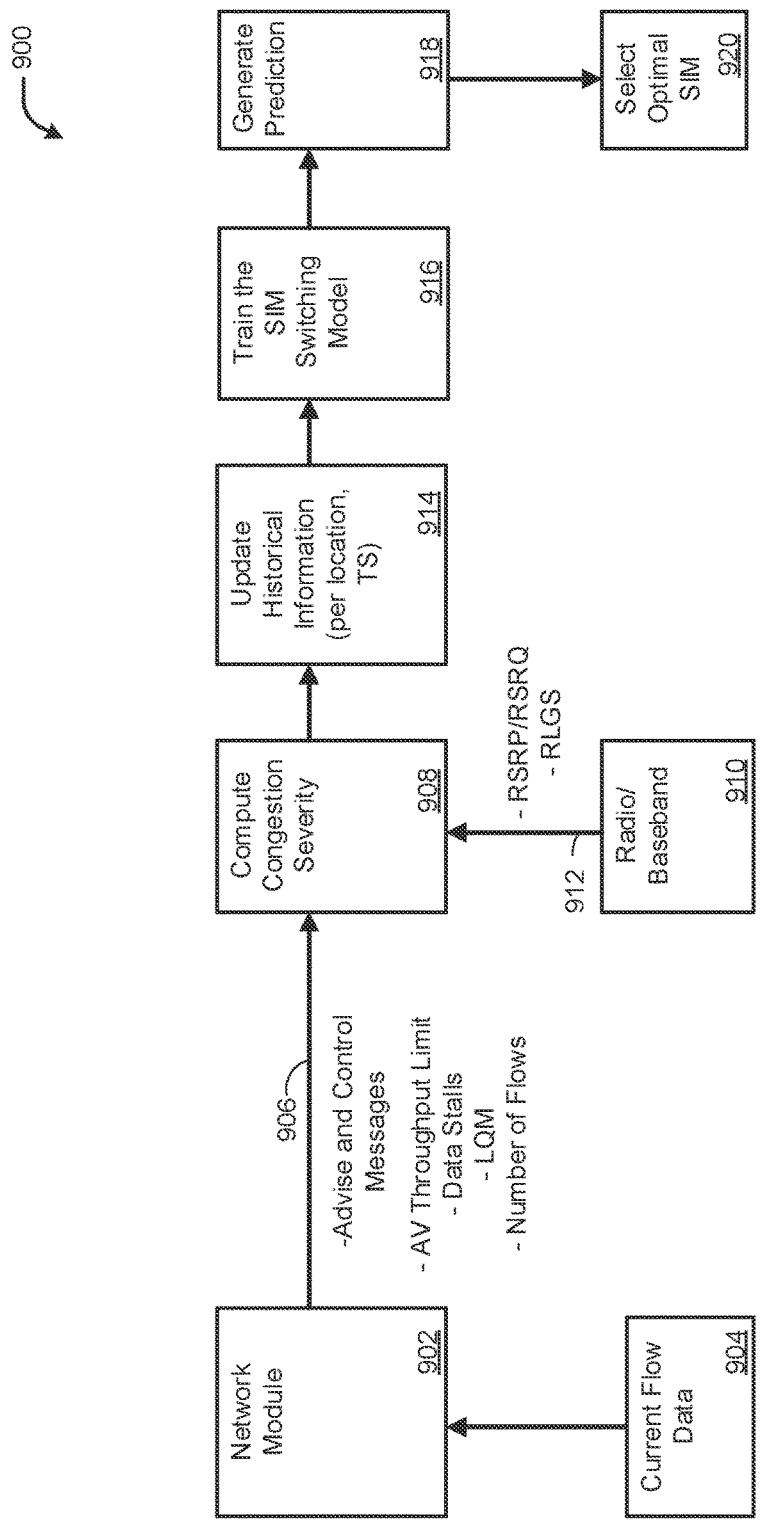
FIG. 6 illustrates an example of a process for selection of a SIM in a dual-SIM device or system.

FIG. 6 illustrates an example of a process 900 for selection of a SIM in a dual-SIM device or system. As described in reference to FIG. 5, the process for system selection may include a determination by the communication module 602 of whether to switch from a first SIM to a second, different SIM of the UE (e.g., from a DDS SIM to a non-DDS SIM or vice versa). The networking module 902 (similar to module 822 previously described in reference to FIG. 5) is configured to receive current flow data 904 and generate advise and control messages. For example, the networking module 902 generates data including AV throughput limits, data stall metrics, LQM metrics, a number of flows, and so forth.

The data provided by the networking module 822 enables the data processing module 826 to compute congestion severity at module 908. The congestion severity is a representation of the analysis of the available communication metrics in combination. The communication module 602 can represent the congestion severity as a single output from the plurality of metrics as inputs. The analysis can include processes such as machine learning in which each of the metrics is feature of a feature vector or other input data. For example, the machine learning model can include a classifier configured to output a classification of a congested state or a non-congested state. The analysis can include combining each input as a weighted value for a function that produces a congestion output, where some metrics are weighted more heavily than others. In some implementations, the congestion severity output is itself an input to another machine learning model that determines whether to perform SIM switching, as subsequently described. The congestion severity is also based on radio/baseband data 910 received from the modem, such as RSRP/RSRQ and RLGS data. In an example, congestion severity is a binary output, such as low congestion or high congestion.

The communication module 602 updates (914) a record of historical information about the network 606. For example, The communication module 602 updates a record of congestion for a given location or node, for a given time of day, etc. for use in predicting theoretical throughput or congestion severity for either NR or LTE for the SIM that is in use.

The communication module 602 trains (916) the SIM switching model using the historical data and current data obtained. The model can be a machine learning model, in which historical data and present data are weighted inputs. The model, for example, can include a neural network or other such machine learning model configured to output predictions for performance for each SIM. The prediction can be for future location(s) or time period(s) of operation.

The model used by the communication module 602 can include a multi-armed bandit (MAB) model. A MAB model is configured for balancing reward maximization (e.g., achieving lower congestion) based on knowledge already acquired (e.g., historic communication metrics) with attempting new actions to further improve the model (e.g., an exploitation vs. exploration tradeoff). Here, exploitation refers to exploiting the reward of staying on a chosen SIM, whereas exploration refers to switching to the other SIM, which may have lower congestion. The communication module 602 can chose to use the current SIM, for which congestion may disappear, or trade to a secondary SIM which is less desirable for use but for which congestion may not be present or for which congestion may abate more quickly, improving overall performance.

The model of the communication module 602 for SIM switching includes data vectors stored in the historical data database. The vector can include a location tag (e.g., cell or global ID/frequency), a time stamp, a identifier of the active SIM (e.g., SIM 1 or SIM 2), a current reward value representing a current congestion level, a historic congestion value associated with the location or timestamp for the given SIM, a range for RRSP/RSRQ values, and a predicted congestion value.

The communication module 602 gathers historic data at time intervals. In some implementations, the time intervals are each hour, every two hours, every 5 hours, or any similar time interval. For each time and each location that data are acquired, the MAB model is updated. In this way, a history is built for each location based on the LRU rank of that location. In some implementations, a congestion prediction is made only if a minimum amount of historic data (e.g., over a given number of hours or days) are available for a given location.

Collection of historic data by the communication module 602 can be limited to acquire more representative data. For example, the communication module 602 can be configured to gather historic data only when in good radio coverage. In some implementations, the weighting value associated with switching SIMs is increased if congestion levels are very high on the current SIM.

The communication module 602 is configured to output, based the computations of the trained model for SIM switching, a prediction of the performance for each SIM of the dual-SIM configuration. The performance can represent a throughput associated with the respective SIM. The communication module 602 selects (920) the SIM associated with better (optimal) performance, such as a higher throughput value or other such metric.

The MAB model of the communication module 602 is configured to accommodate instantaneous SIM degradation. The communication module 602 is configured to increase a weighting value for switching SIM when a sudden increase in congestion or drop off in link quality is detected in the present communication using the present SIM. A sudden drop off in link quality is measured using the congestion indicators or metrics previously described, and is represented by a change greater than a threshold in a less than a given amount of time. Additionally, to ensure that the prediction of the optimal SIM is reasonable, the communication module 602 is configured to check a threshold of RRSP/RSRQ to determine if the threshold is reasonable (e.g., called RLGS+). In an example, if a daily limit for a prepaid SIM card is exhausted, the SIM is configured to switch, even though historic data may indicate that the present SIM should operate without congestion.

In some implementations, a non-machine learning model or history based model can be used by the UE for determining SIM switching. The UE can determine to switch the SIM based on a current level of congestion, without referring to or storing a past record of historical information. The UE is thus configured for an immediate recovery mode from congestion, as sometimes the previously-described MAB model-based approach can take time (e.g., to gather some history data) to converge to a classification.

Figure 7:
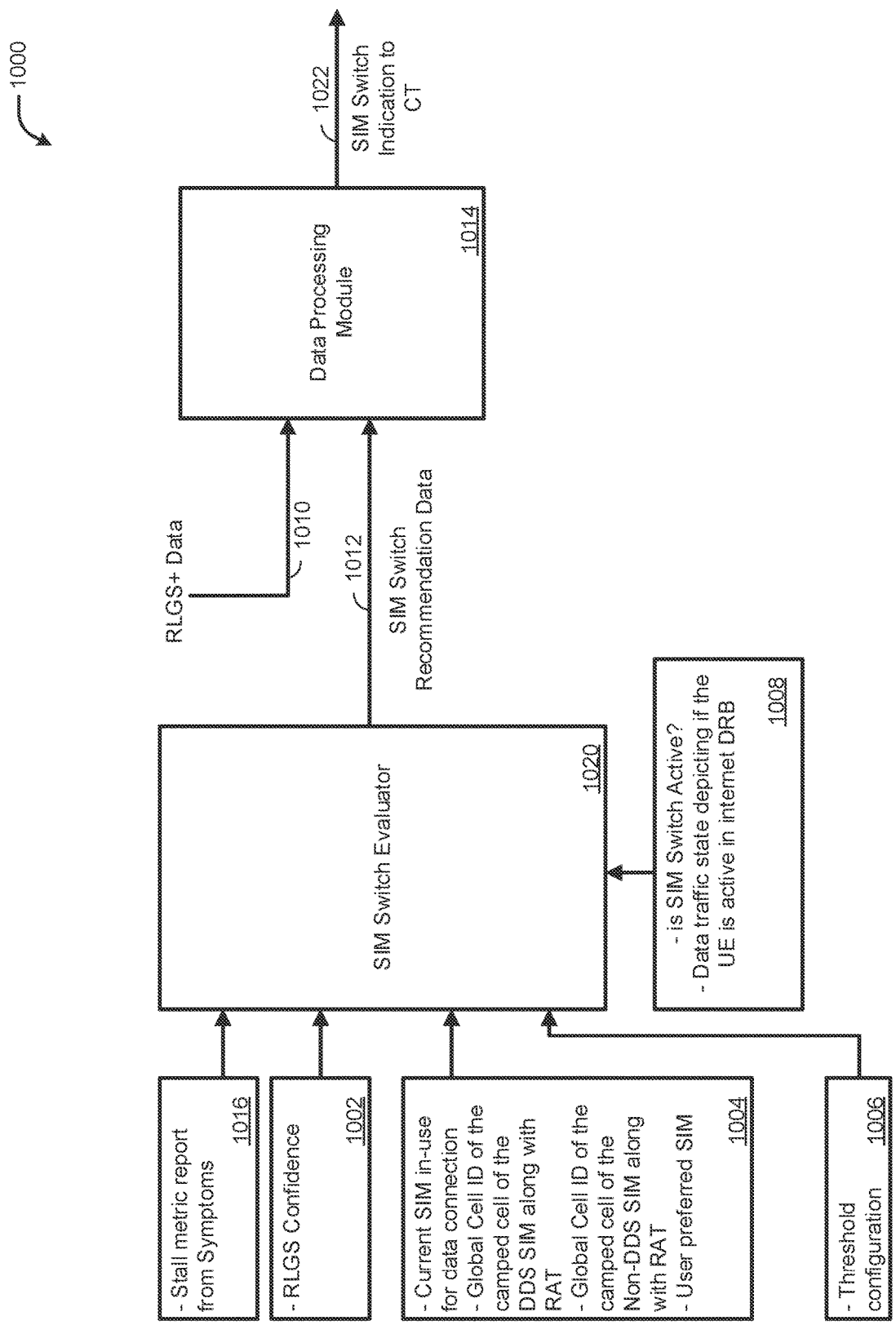
FIG. 7 illustrates an example system for selection of a SIM in a dual-SIM device or system.

FIG. 7 illustrates an example system 1000 for selection of a SIM in a dual-SIM device or system, and shows additional details of data processed for the process 900 of FIG. 6. In the system 1000, a SIM switch evaluator 1020 is configured to receive data from a variety of data sources for generating a switch recommendation as previously described. The SIM switch evaluator 1020 receives stall metric report data 1016 from the networking module, as previously described. The SIM switch evaluator 1020 receives RLGS confidence data 1002 from the RLGS system. The SIM switch evaluator 1020 receives link metrics data 1004 including current SIM in-use data for the current connection, the global cell ID of the camped cell of both the non-DDS and DDS SIM in addition to their respective RAT, and data describing the user-preferred SIM. The SIM switch evaluator 1020 receives data representing a threshold configuration 1006 for the communication module 602. For example, the exact thresholds of metrics data can be tuned or otherwise adjusted to define a "congested" state. The SIM switch evaluator 1020 receives data 1008 representing whether the SIM switch is active, which enables or disables SIM switching. The data 1008 also includes a data traffic state specifying whether the communication module 602 is active in an internet data radio bearer (DRB) traffic state.

The SIM switch evaluator 1020 generates SIM switch recommendation data 1012 using the models (such as the MAB model) as previously described. The data processing module 1014 (e.g., module 826 of FIG. 5) receives the recommendation data 1012 in addition to RLGS+ data as previously described. The data processing module 1014 determines whether to switch the SIM (e.g., if system selection does not provide a better result). The data processing module 1014 sends SIM switch indication data 1022 indicative of whether a switch should occur to the communications module (e.g., module 824 of FIG. 5).

The process of SIM switching can include the following example embodiment. A UE is configured for dual-SIM operation. In a first time period, the UE (e.g., managed by the communication module 602) uses the DDS SIM (e.g., called SIM 1), and communication is in a non-congested state. In a second, subsequent time period, the SIM is operating in a congested state. RLGS+ data indicate that the non-DDS SIM (e.g., SIM 2) is or can be operating in a low congestion state. The SIM switch evaluator 1020 recommends a SIM switch.

The non-DDS SIM operates in a low congestion state. A hysteresis timer starts, and a back-off timer starts. The UE uses the non-DDS SIM regardless of congestion until the hysteresis timer expires. Once the back-off timer expires, a preference is expressed to operating using the DDS SIM (e.g., SIM 1). The UE continues using the non-DDS SIM until the hysteresis timer expires. When the hysteresis timer expires, the UE performs an analysis to determine whether to switch SIM back to the DDS SIM. Even if congestion is low for the non-DDS SIM, the UE switches back to the DDS SIM if congestion on the DDS-SIM is low, due to the preference for using the DDS SIM.

Once the communication module 602 switches the UE back to the DDS the UE initializes the hysteresis timer. The UE does not switch back to the non-DDS SIM until the hysteresis timer expires, though the UE continues to collect congestion metrics and make congestion predictions.

Figure 8:
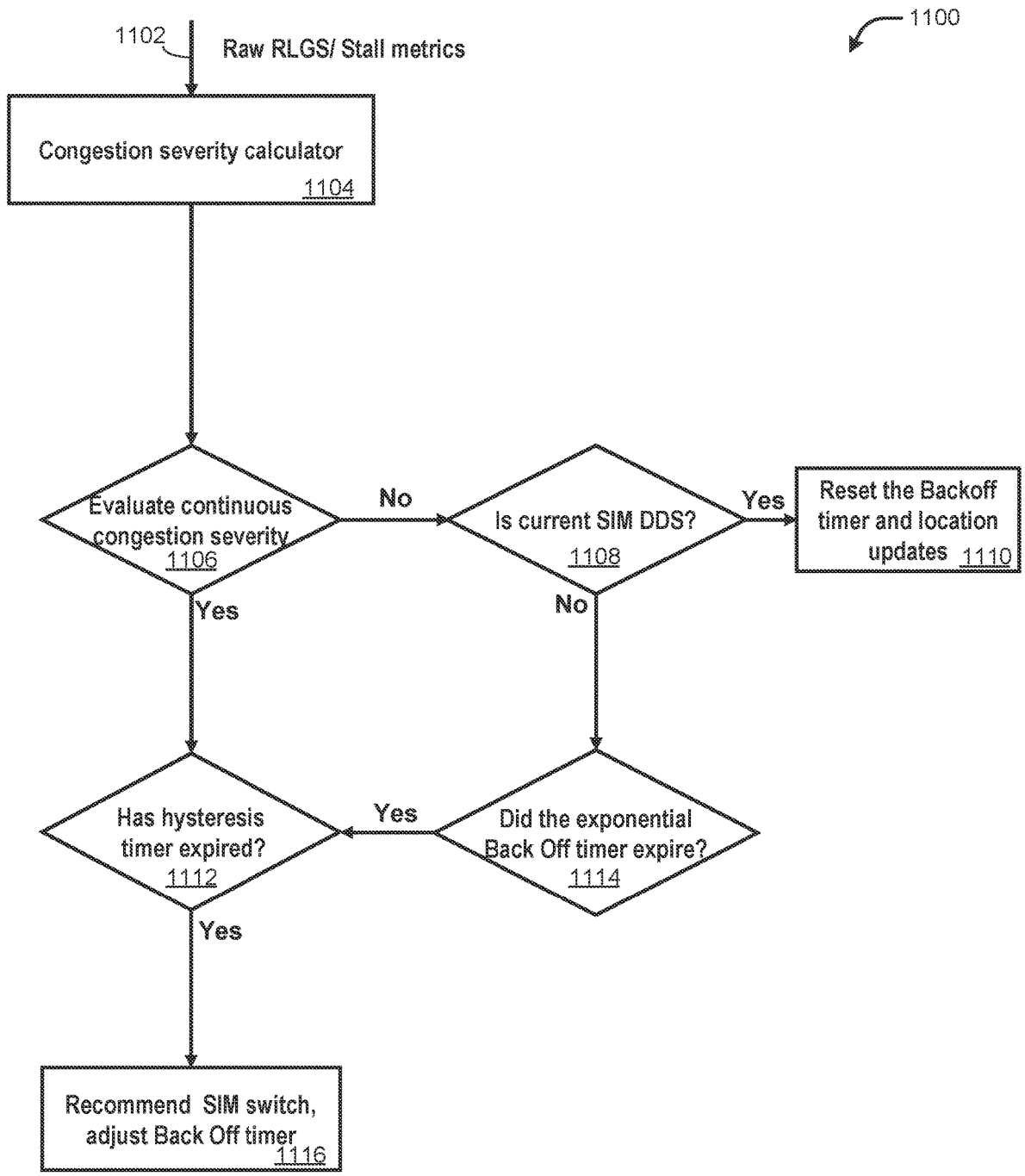
FIGS. 8-9 illustrate example processes for selection of a SIM in a dual-SIM device or system.
Figure 9:
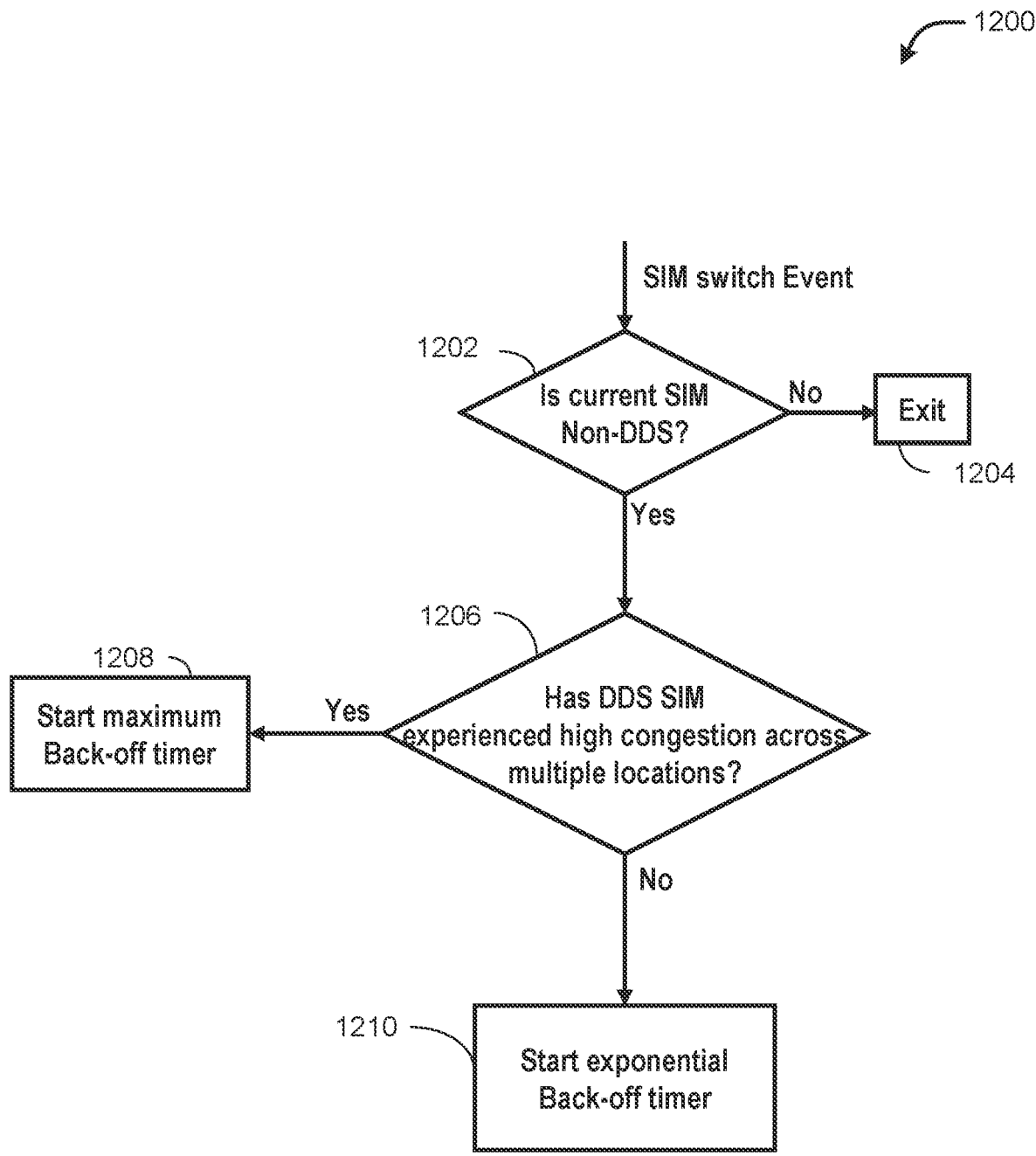

FIGS. 8-9 illustrate example processes 1100, 1200 for selection of a SIM in a dual-SIM device or system. The process 1100 includes receiving raw RLGS and stall metrics 1102. A communication module (e.g., module 602 previously described) performs a determination (1104) of congestion severity. As previously described, this includes determining whether congestion is high or low. In some implementations, additional congestion levels can be determined rather than a binary output. The congestion severity calculator (CSC) accumulates the RLGS and data stall samples in a sampling window. The stall severity is calculated by determining the number of HTTP/HTTPS/TCP requests that are timed out in a given wait period. The weight of the stall severity is increased if varying endpoints of HTTP/HTTPS/TCP requests are timing out. If within a given wait period multiple such unique endpoints are stalled, then stall severity is computed as "high." Otherwise, the stall severity can "low," depending on how many unique endpoints are stalled and/or how many severity states are being considered.

The CSC computes a severity index stating 'High' or low' congestion. Thus, the communication module is configured to evaluate (1106) continuous congestion severity for different locations. If severity is high, the hysteresis timer is checked (1112). If congestion is low, the SIM is checked to determine whether the current SIM is the DDS SIM. If the current SIM is the DDS sim, the back-off timer is reset (1110) and the location is updated. If the current SIM is non-DDS, the back-off timer is checked (1114) to determine whether it expired. If it expired, the hysteresis timer is checked (1112). If the hysteresis timer also expired, the communication module switches (1116) the UE from SIM to DDS SIM, and the back-off timer is adjusted. An example for congestion calculations is seen in Table 1:

TABLE 1

| Congestion Severity Calculator States | | |
|---|---|---|
| RLGS | Stall Severity | Severity Index (Yes = High) |
| 0 | 0 | NO |
| 0 | 1 | YES |
| 1 | 0 | NO |
| 1 | 1 | YES |
| −1 | 0 | NO |
| −1 | 1 | YES |

FIG. 9 shows process 1200 for SIM switching. When a SIM switch event occurs, a communication module (e.g., communication module 602 previously described) checks to determine (1202) whether the current SIM is the non-DDS SIM. If the current SIM is DDS-SIM, the process exits (1204). The communication module checks to determine (1206) if the DDS SIM has experienced high congestion across multiple locations. If the SIM has experienced high congestion across multiple locations, the communication module starts (1208) the maximum back-off timer. In this case, the DDS SIM shows high congestion across all locations. The DDS substitution can be performed after the maximum back-off timer expiry.

If congestion has not been experienced across multiple locations, the UE starts (1210) an exponential back-off timer (which may increase over time to the value of the maximum back-off timer). This helps achieve the goal of the UE returning to the DDS SIM as soon as practical to do so.

Figure 10:
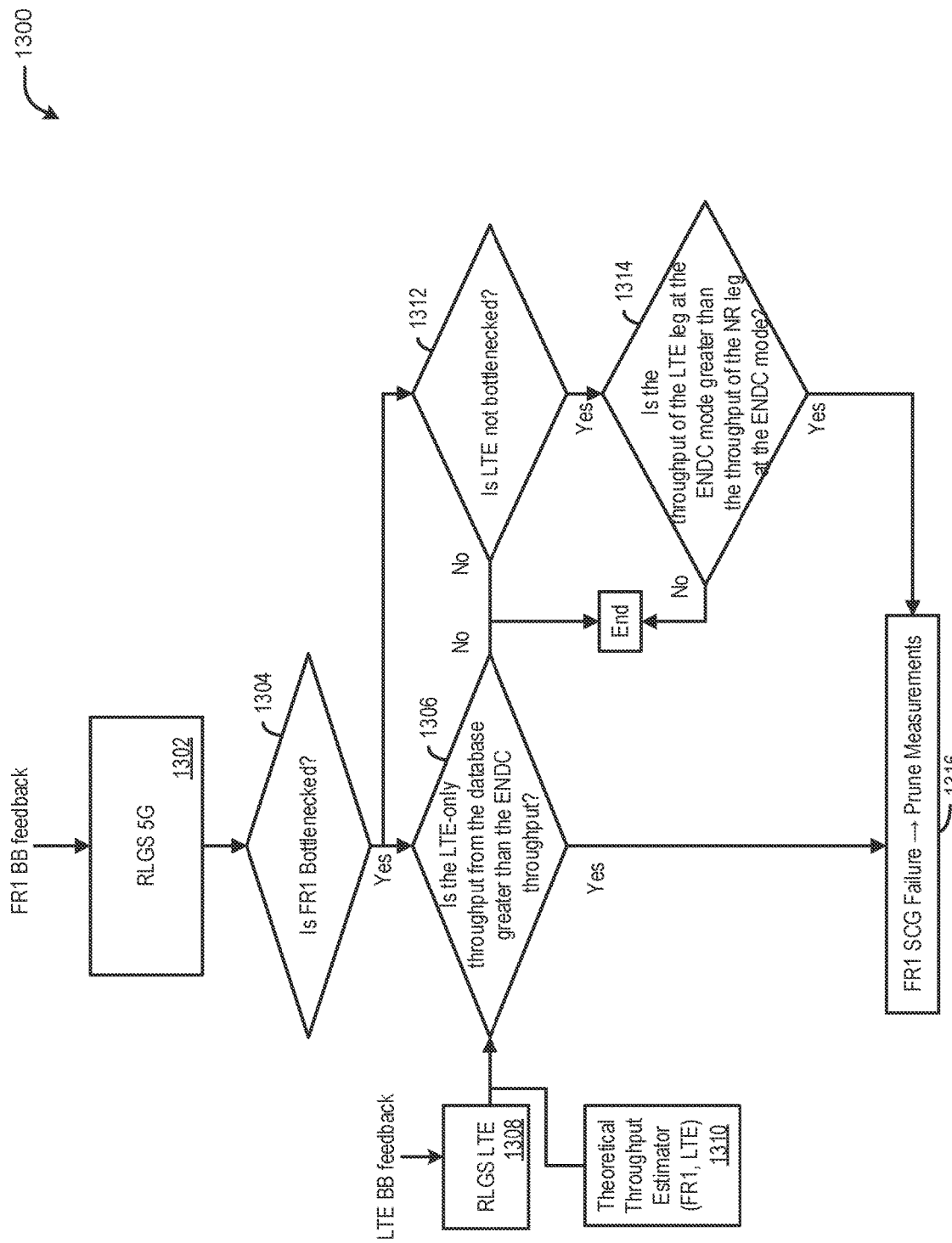
FIGS. 10-11 illustrate example processes for selection of a device or system for high-throughput wireless communications.
Figure 11:
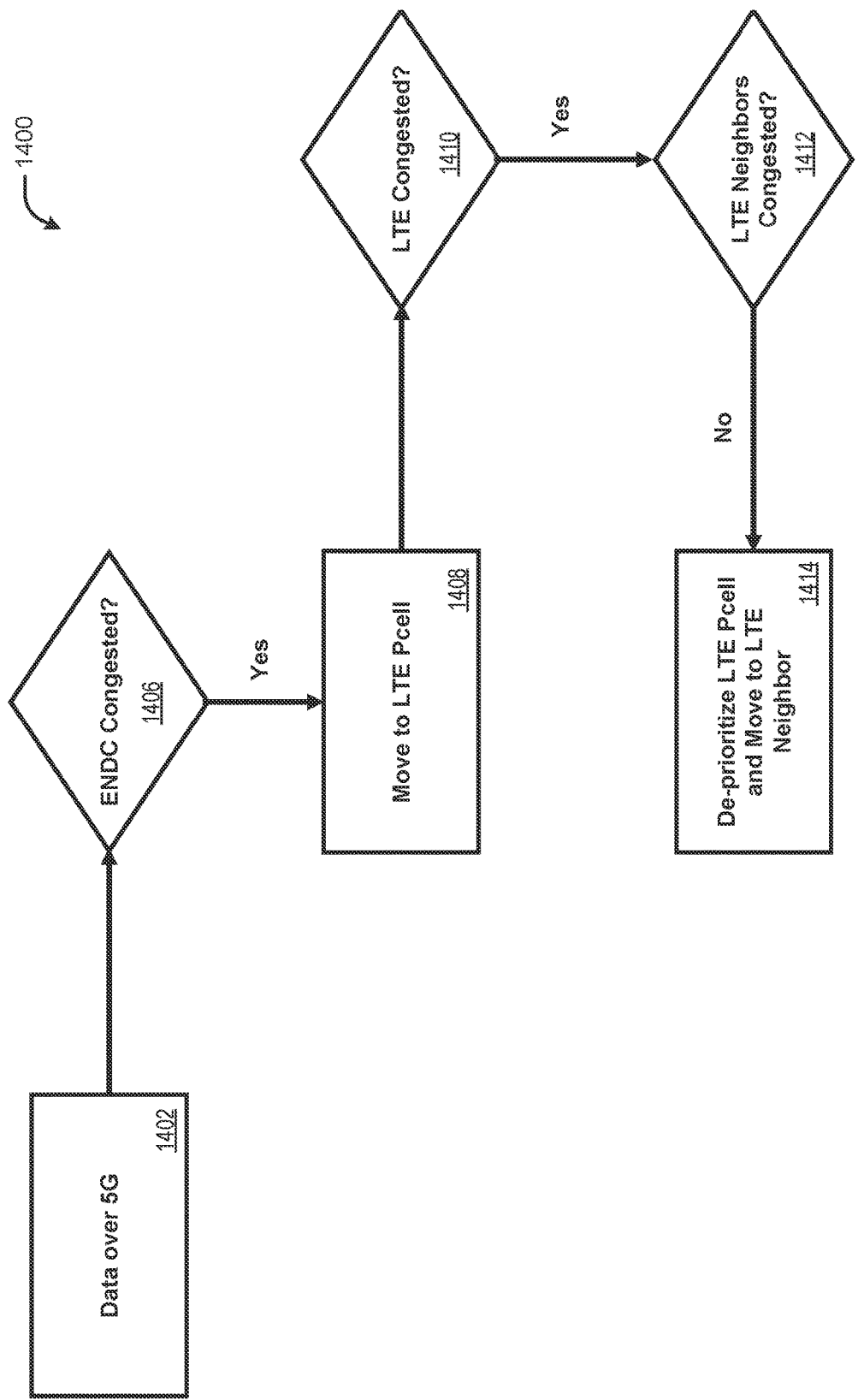

FIGS. 10-11 illustrate example processes 1300, 1400 for selection of a device or system for high-throughput wireless communications. FIG. 10 shows a process 1300 for FR1 pruning at ENDC via RLGS. A communication module (e.g., module 602 previously described) receives (1302) FR1 BB feedback via RLGS 5G. The UE determines (1304) if FR1 is bottlenecked. If it is not, the switching process 1300 ends. If FR1 is bottlenecked, the UE determines if the LTE-only throughput from the database greater than the ENDC throughput. If the result is affirmative, the UE generates (1316) a FR1 SCG failure message for pruning FR1 measurements to initiate a switch to LTE. If the result is no affirmative, the communication module ends the switching process. Alternatively, or in addition, the UE determines (1312) if the LTE is bottlenecked. If the LTE is bottlenecked, the switching process ends. If the LTE Is not bottlenecked, the UE determines whether the throughput of the LTE leg at the ENDC mode is greater than the throughput of the NR leg at the ENDC mode. If the result is affirmative, the If the result is affirmative, the UE generates (1316) a FR1 SCG failure message for pruning FR1 measurements to initiate a switch to LTE. If the result is not affirmative, the switching process ends.

FIG. 11 illustrates a process 1400 for better system selection. A communication module (e.g., module 602 previously described) receives (1402) data over a network (e.g., 5G LTE). The communication module determines (1406) if the ENDC is congested. If the result is affirmative, the communication module moves (1408) the UE to a LTE Pcell. If the result is not affirmative, the switching process ends. The communication module determines (1410) if the LTE is congested. If the result is affirmative, the UE determines (1412) if the LTE neighbors are congested. If the LTE neighbors are not congested, the UE de-prioritizes (1414) the LTE Pcell and moves to the LTE neighbor.

Generally, the communication module is configured to track inputs from various layers and perform a better system selection based on congestion severity. The UE is configured to select the high priority RAT if it is not congested. The communication module avoids switching between LTE/NR repeatedly due to hysteresis limitations. The communication module is configured to perform SIM switching as a last resort if system selection shows high congestion on either system. When all SSIM mitigations are exhausted the UE is configured to perform RLGS+ analysis on a non-DDS SIM substitute and perform the SIM switch evaluation previously described (e.g., trigger DDS to non-DDS SIM switching).

In some implementations, the communication module is configured to trigger LQM abort while congested. This causes background data to be temporarily suspended in high congestion scenarios. The communication module reverts to regular LQM once congestion levels are reduced.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, RD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Examples

In a first aspect, a method performed by user equipment (UE) for communicating over a wireless communication network includes receiving data representing one or more communication quality metrics for communication on a New Radio (NR) communication link of the wireless communication network. The method includes determining, based on the data representing the one or more communication quality metrics, a data throughput for the NR communication link of the wireless communication network. The method includes estimating a theoretical throughput for using a Long Term Evolution (LTE) communications link of the wireless network. The method includes comparing the data throughput using the NR communication link to the theoretical throughput for using the LTE communication link. The method includes causing a switch, based on the comparison, from the NR communication link to the LTE communication link.

In an example of the previous aspect, the method includes causing the switch, based on the comparison, comprises generating a switching signal to block FR1 measurements.

In an example including any of the previous examples, causing the switch, based on the comparison, comprises dropping a FR1 secondary cell group (SCG) signaling radio bearer (SRB).

In another example including any of the previous examples, the method further includes sending the switching signal to a baseband modem to cause the baseband modem to generate an SCG failure message for sending to a node of the communications network.

In another example including any of the previous examples, the method includes receiving LTE carrier aggregation (CA) configuration data. The theoretical throughput for using the LTE communications link is based on the LTE CA configuration data.

In another example including any of the previous examples, the LTE configuration data comprise at least one of: parallel communications controller (PCC) or serial communications controller (SCC) bandwidth levels, a quadrature amplitude modulation (QAM) configuration, and multiple-in multiple-out (MIMO) configuration data for a non-ENDC mode.

In another example including any of the previous examples, the data representing the one or more communication quality metrics for the NR communications link include at least one of a signal to noise ratio (SNR), a measured bandwidth (BW), a downlink data spit percentage, a PScell Reference Signal Received Power (RSRP), Reference Signal Received Quality (RSRQ), and Received Signal Strength Indicator (RSSI).

In another example including any of the previous examples, theoretical throughput for using the LTE communications link comprises a LTE CA combined theoretical throughput value based on the RRC configuration including bandwidth, Quadrature amplitude modulation (QAM) and MIMO configurations for LTE cell global identity (CGI) when the SDM disables NR, and wherein the method further comprises storing the LTE CA combined theoretical throughput value.

In another example including any of the previous examples, the method includes predicting a future NR throughput level based on at least one of RSRP, RSRQ, and RSSI.

In another example including any of the previous examples, comparing the data throughput using the NR communication link to the theoretical throughput for using the LTE communication link comprises determining that FR1 SNR and BW are each below a threshold value, DL Split data is flowing over FR1 over a threshold value, and a higher-order LTE CA is feasible.

In another example including any of the previous examples, the threshold value for SNR is −1 dB, the threshold value of BW is 10 MHz, and the threshold value of DL split data is 5%.

In another example including any of the previous examples, the higher-order LTE CA represents a LTE CA theoretical throughput that is either greater than or equal to NR throughput.

In another example including any of the previous examples, the method includes detecting, by an RLGS module, network congestion for the LTE communication link, and switching from the LTE communication link to the NR communication link.

In another example including any of the previous examples, the method includes setting a hysteresis timer that prevents a second switch between the LTE communication link and the NR communication link for a set period of time once a first switch has occurred.

In another example including any of the previous examples, the method includes identifying a first subscriber identification module (SIM) for the UE, the first SIM being in use for the UE. The method includes identifying a second SIM for the UE. The method includes determining that a first communication link associated with the first SIM is in a congested state. The method includes in response to the determining, switching to a second communication link associated with the second SIM.

In another example including any of the previous examples, the congested state represents one or more values of RSRP, RSRQ, a number of data stalls, and RLGS data failing to satisfy a threshold.

In another example including any of the previous examples, the method includes obtaining historic congestion data for the first SIM and the second SIM, the historic congestion data including one or more quality metrics at a particular location of the UE and a particular time. Determining that the first communication link associated with the first SIM is in the congested state is based on the historic congestion data.

In another example including any of the previous examples, the method includes predicting that the first SIM will remain in a congested state based on the historic data. The method includes delaying a switch back to the first SIM or switching to the second SIM based on the predicting.

In another example including any of the previous examples, the method includes training a statistical model based on the historic data. The predicting is based on the statistical model.

In another example including any of the previous examples, the statistical model comprises a multi-armed bandit (MAB) model.

In another example including any of the previous examples, the method includes initializing, in response to switching to the second communication link associated with the second SIM, a hysteresis timer that is configured to prevent a second switch back to the first communication link of the first SIM until after the hysteresis timer expires.

In another example including any of the previous examples, the method includes initializing, in response to switching to the second communication link associated with the second SIM, a back off timer that increases a likelihood of switching to a default data SIM once the back off timer expires.

In another example including any of the previous examples, the first SIM is a default data SIM (DDS) and wherein the second SIM is a non-DDS SIM.

In another example including any of the previous examples, the second SIM is a DDS SIM and wherein the first SIM is a non-DDS SIM.

In another example including any of the previous examples, the first communication link and the second communication link are both NR communication links.

In another example including any of the previous examples, the first communication link and the second communication link are both LTE communication links.

In another example including any of the previous examples, the first communication link is a NR communication link, and wherein the second communication link is a LTE communication link.

In another example including any of the previous examples, the first communication link is a LTE communication link, and wherein the second communication link is a NR communication link.

In another example including any of the previous examples, the method including determining that E-UTRAN New Radio-Dual Connectivity (ENDC) communication link is congested based on one or more quality metrics associated with the ENDC communication link. The method includes switching, based on the determining, to an LTE Pcell. The method includes determining that the LTE Pcell is congested. The method includes determining that a neighbor cell to the LTE Pcell is not congested. The method includes switching to the neighbor.

In another example, the method includes determining congestion on a WiFi network is high. The method includes determining that the theoretical throughput on either a NR or LTE communications link is low. The method includes switching from the WiFi link to the LTE or NR link.

In a second aspect, a method performed by user equipment (UE) for communicating over a wireless communication network. The method includes receiving RLGS quality metrics data for a communications link of a first subscriber identification module (SIM) for the UE. The method includes determining a congestion severity for the first SIM. The method includes determining that the congestion severity exceeds a threshold. The method includes switching to a second SIM based on the determining that the congestion severity exceeds the threshold.

In an example including any of the previous examples of the second aspect, determining that the congestion severity exceeds a threshold comprises: inputting the RLGS quality metrics data and data representing a number of data stalls into a machine learning model that is trained with historic RLGS quality metrics data. The method includes executing the machine learning model to cause the machine learning model to generate an output indicative of a high congestion classification or a low congestion classification, wherein the high congestion classification represents the congestion severity that exceeds the threshold.

In another example including any of the previous examples of the second aspect, the historic data represents RLGS quality metrics data obtained, for the first SIM, at one or more different locations and at one or more different times for each of the one or more different locations.

In another example including any of the previous examples of the second aspect, the method includes setting a hysteresis timer configured to prevent a second switch from the second SIM to the first SIM until a predetermined time period expires.

In another example including any of the previous examples of the second aspect, the method includes setting a back-off timer configured to pause a bias for switching to a DDS SIM of the first SIM and the second SIM until a predetermined time period expires.

In another example including any of the previous examples of the second aspect, the first SIM is a default data SIM (DDS) and wherein the second SIM is a non-DDS SIM.

In another example including any of the previous examples of the second aspect, wherein the second SIM is a DDS SIM and wherein the first SIM is a non-DDS SIM.

In a third aspect, a user equipment (UE) for communicating over a wireless communication network includes at least one processing device and a memory storing instructions, that when executed by the at least one processing device, cause the at least one processing device to perform operations. The operations include receiving data representing one or more communication quality metrics for communication on a New Radio (NR) communication link of the wireless communication network. The operations include determining, based on the data representing the one or more communication quality metrics, a data throughput for the NR communication link of the wireless communication network. The operations include estimating a theoretical throughput for using a Long Term Evolution (LTE) communications link of the wireless network. The operations include comparing the data throughput using the NR communication link to the theoretical throughput for using the LTE communication link. The operations include causing a switch, based on the comparison, from the NR communication link to the LTE communication link.

In a fourth aspect, a user equipment (UE) for communicating over a wireless communication network includes at least one processing device and a memory storing instructions, that when executed by the at least one processing device, cause the at least one processing device to perform operations. The operations include receiving RLGS quality metrics data for a communications link of a first subscriber identification module (SIM) for the UE. The operations include determining a congestion severity for the first SIM. The operations include determining that the congestion severity exceeds a threshold. The operations include switching to a second SIM based on the determining that the congestion severity exceeds the threshold.

What is claimed is:

1. A method for communicating over wireless communication networks, the method comprising:
    decoding data representing one or more communication quality metrics for communication for a first communication link of a first wireless communication network;
    determining, based on the data representing the one or more communication quality metrics, a data throughput for the first communication link of the first wireless communication network of a dual connectivity mode;
    estimating a theoretical throughput for using a second communications link of a second wireless communication network of a non-dual connectivity mode, wherein the second wireless communication network is different from the first wireless communication network;
    determining that a threshold amount of time has passed since a previous switch from the first communication link to the second communication link occurred, wherein the threshold amount of time is set to different values based on a type of application for which a communication link switch is being performed;
    comparing the data throughput using the first communication link of the dual connectivity mode to the theoretical throughput for using the second communication link of the non-dual connectivity mode; and
    generating instructions configured to cause a switch, based on the comparing of the data throughput and the determining that the threshold amount of time has passed, from the first communication link to the second communication link.

2. The method of claim 1, wherein the first communication link includes a New Radio (NR) communication link, and wherein the second communication link includes a Long Term Evolution (LTE) communication link.

3. The method of claim 1, wherein the first communication link includes a LTE communication link, wherein the second communication link includes an NR communication link.

4. The method of claim 1, wherein causing the switch, based on the comparing, comprises generating a switching signal to block frequency range 1 (FR1) measurements.

5. The method of claim 4, wherein causing the switch, based on the comparing, comprises dropping a FR1 secondary cell group (SCG) signaling radio bearer (SRB).

6. The method of claim 4, further comprising sending the switching signal to a baseband modem to cause the baseband modem to generate a secondary cell group failure message for sending to a node of the first wireless communications network.

7. The method of claim 1, wherein the data representing the one or more communication quality metrics for the first communications link include at least one of a signal to noise ratio (SNR), a measured bandwidth (BW), a downlink data spit percentage, a PScell Reference Signal Received Power (RSRP), Reference Signal Received Quality (RSRQ), and Received Signal Strength Indicator (RSSI).

8. The method of claim 1, further comprising:
predicting a future NR throughput level based on at least one of RSRP, RSRQ, and RSSI.

9. The method of claim 1, further comprising:
setting a timer that prevents the switch between the first communication link of the first wireless communication network and the second communication link of the second wireless communication network for the threshold amount of time once the previous switch has occurred.

10. An apparatus for communicating over a wireless communication network, the apparatus comprising:
at least one processing device configured to perform operations including:
decoding data representing one or more communication quality metrics for communication for a first communication link of a first wireless communication network;
determining, based on the data representing the one or more communication quality metrics, a data throughput for the first communication link of the first wireless communication network of a dual connectivity mode;
estimating a theoretical throughput for using a second communications link of a second wireless communication network of a non-dual connectivity mode, wherein the second wireless communication network is different from the first wireless communication network;
determining that a threshold amount of time has passed since a previous switch from the first communication link to the second communication link occurred, wherein the threshold amount of time is set to different values based on a type of application for which a communication link switch is being performed;
comparing the data throughput using the first communication link of the dual connectivity mode to the theoretical throughput for using the second communication link of the non-dual connectivity mode; and
generating instructions configured to cause a switch, based on the comparing of the data throughput and the determining that the threshold amount of time has passed, from the first communication link to the second communication link.

* * * * *